(12) United States Patent
Njus et al.

(10) Patent No.: US 7,846,372 B1
(45) Date of Patent: Dec. 7, 2010

(54) METHOD OF MAKING A VEGETABLE OIL-BASED CANDLE

(75) Inventors: Donald James Njus, New Hampton, IA (US); Jon Nicolaisen, New Hampton, IA (US)

(73) Assignee: SoyBasics, LLC, New Hampton, IA (US)

( * ) Notice: Subject to any disclaimer, the term of this patent is extended or adjusted under 35 U.S.C. 154(b) by 1125 days.

(21) Appl. No.: 10/836,942

(22) Filed: Apr. 30, 2004

Related U.S. Application Data

(60) Provisional application No. 60/484,955, filed on Jul. 3, 2003, provisional application No. 60/484,954, filed on Jul. 3, 2003.

(51) Int. Cl.
*B29C 67/24* (2006.01)

(52) U.S. Cl. ........................ 264/330; 264/239; 264/256; 264/271.1; 425/117; 425/803; 427/442; 44/275; 34/372; 431/288

(58) Field of Classification Search ................. 264/330, 264/239, 256, 271.1; 425/117; 427/442; 44/275; 34/372
See application file for complete search history.

(56) References Cited

U.S. PATENT DOCUMENTS

| | | | | |
|---|---|---|---|---|
| 2,777,480 | A | * | 1/1957 | Linda ........................... 141/11 |
| 4,518,553 | A | * | 5/1985 | Yarossi et al. ................. 264/234 |
| 6,099,877 | A | | 8/2000 | Schuppan |
| 6,251,481 | B1 | * | 6/2001 | Elmore ........................ 427/262 |
| 6,503,285 | B1 | | 1/2003 | Murphy |
| 6,645,261 | B2 | | 11/2003 | Murphy |
| 6,770,104 | B2 | | 8/2004 | Murphy |
| 6,773,469 | B2 | | 8/2004 | Murphy |
| 6,797,020 | B2 | | 9/2004 | Murphy |
| 6,824,572 | B2 | | 11/2004 | Murphy |
| 7,192,457 | B2 | * | 3/2007 | Murphy et al. ................. 44/275 |
| 2002/0157303 | A1 | | 10/2002 | Murphy et al. |
| 2003/0017431 | A1 | | 1/2003 | Murphy |
| 2003/0057599 | A1 | * | 3/2003 | Murphy et al. ............... 264/237 |
| 2003/0061760 | A1 | * | 4/2003 | Tao et al. ....................... 44/275 |
| 2003/0110683 | A1 | | 6/2003 | Murphy |
| 2004/0047886 | A1 | | 3/2004 | Murphy |
| 2004/0088907 | A1 | | 5/2004 | Murphy |
| 2004/0088908 | A1 | | 5/2004 | Murphy |
| 2004/0221503 | A1 | | 11/2004 | Murphy |
| 2004/0221504 | A1 | | 11/2004 | Murphy |
| 2005/0060927 | A1 | | 3/2005 | Murphy |

FOREIGN PATENT DOCUMENTS

| | | | |
|---|---|---|---|
| JP | 2003206494 | * | 1/2002 |
| WO | WO 02/092736 | | 10/2002 |
| WO | WO03/012016 | | 2/2003 |
| WO | WO 2004/101720 | | 5/2004 |

* cited by examiner

*Primary Examiner*—Jeffrey Wollschlager
*Assistant Examiner*—Stella Yi
(74) *Attorney, Agent, or Firm*—Frost Brown Todd LLC

(57) ABSTRACT

The present invention provides a method of making a candle from a vegetable oil-based candle wax that provides a smooth, solid vegetable oil-based candle having fully integrated color and fragrance.

20 Claims, 2 Drawing Sheets

METHOD OF MAKING A VEGETABLE OIL-BASED CANDLE

CROSS REFERENCE TO RELATED APPLICATIONS

The present application hereby claims priority from the provisional patent application of the same title, Ser. No. 60/484,955 and the provisional patent application titled Vegetable Oil-based Candle, Ser. No. 60/484,954, both filed on Jul. 3, 2003.

FIELD OF THE INVENTION

The present invention relates to vegetable oil-based candles, and in particular, a method of making vegetable oil-based candles.

BACKGROUND OF THE INVENTION

Candles have been used to provide light since early times in human civilization. Although candles are no longer needed for light, they are still very popular for use in decorative applications. At its most basic, a candle consists of a combustible wick surrounded by a configuration of a wax-like material. The heat from a lighted wick causes the wax to melt and travel up the wick in a capillary action, which allows for slow combustion of the wax and the wick.

Although beeswax has traditionally been used as a natural wax for candles, the onset of the petroleum industry sparked the development of paraffin as an alternative wax. Paraffin, an abundant low-cost alternative to beeswax, has become a widely used alternative in present day candlemaking. Even though paraffin is a very commonly used in candlemaking, its use has some significant drawbacks. First, paraffin melts and burns at high temperatures posing a risk to the consumer, or to their home. Additionally, candles made from paraffin do not emit a strong scent because paraffin wax does not hold fragrance well. Further, paraffin, a by-product of crude oil, is the result of non-renewable energy source.

Most importantly, in order for paraffin to be used as candle wax, additives such as urethanes and solvents must be combined with the paraffin. Supplementing the wax with these additives causes black smoke and chemical toxins that can be emitted into the air from the paraffin wax as the candle burns. Further, paraffin, having properties similar to motor oil, diesel fuel, and petroleum grease, emits smoke and soot as it burns, which it thought to cause the release of particulates into the surrounding atmosphere. This release of particulates can adversely affect the health of those who inhale them.

In an effort to overcome some of these problems, there has been an attempt to provide candles made predominantly from natural vegetable-based materials, such as, for example soybean, palm, cottonseed or other vegetable-based materials. Although the formation of candles from the above materials to date have been moderately successful, there are lingering problems associated with vegetable oil-based candles including cracking, air pocket formation, wax shrinkage, as well as a lack of complete color and fragrance integration into the resultant candles.

Consequently, a significant need exists for an improved method of making a candle using a candle wax that is non-toxic, made from a renewable source, and produced at a cost equivalent to the currently used paraffin, but does not suffer from the above-listed performance problems.

The method of making a vegetable oil-based candle as disclosed by the present disclosure generates a candle that contains a strong, even fragrance and displays solid, vibrant color. The candles, however, do not contain the previously mentioned performance problems of cracking, fragrance, coloring integration, etc. The vegetable oil-based candle wax of the present invention is particularly advantageous for use in forming container candles, as the candle wax is formulated so that it cools and cures, but does not significantly reduce in size, and therefore a clean looking candle is manufactured.

The present invention addresses these and other problems of the prior art by providing a novel method of making a vegetable oil-based candle.

BRIEF SUMMARY OF THE INVENTION

A method of making a candle from a vegetable oil-based candle wax is provided by the present specification, which includes the steps of (1) combining a vegetable oil component and at least one additive to form a wax composition, (2) cooling the wax composition to form a wax slurry, and (3) cooling the wax slurry to form a candle. If desired, fragrance and coloring can be added to the wax composition. The wax slurry can optionally be placed in a jar, mold, or other container and cooled to form a candle.

The method of making a candle wax of the present invention may further include using a tank having a sleeve that contains a cooling substance, or any other method of temperature control to manipulate cooling and slurry formation of the wax composition such that it generates small, stable crystals.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE INVENTION

Figure 1:
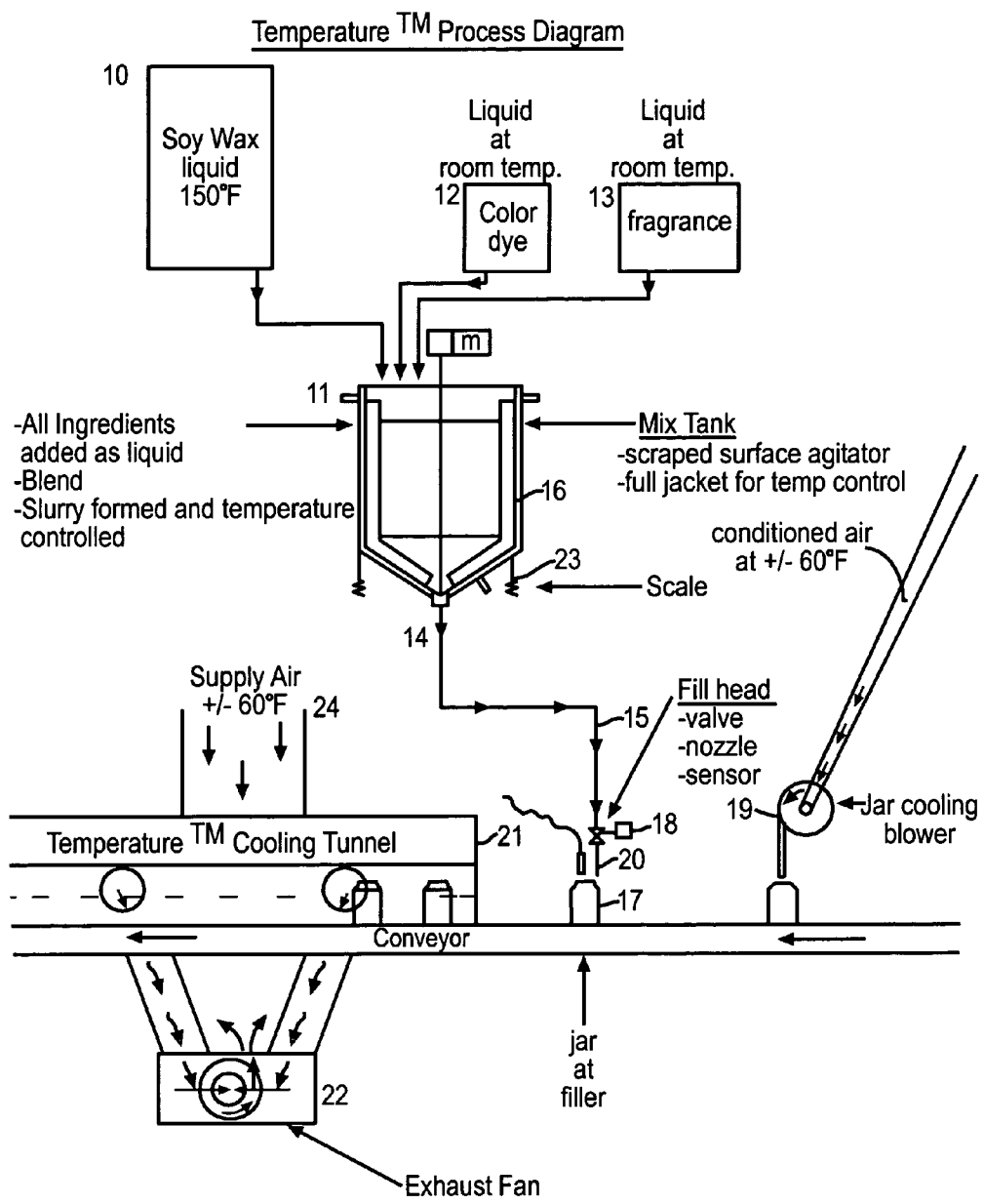
FIG. 1 depicts a preferred embodiment for a method of manufacturing a vegetable oil-based candle.
Figure 2:
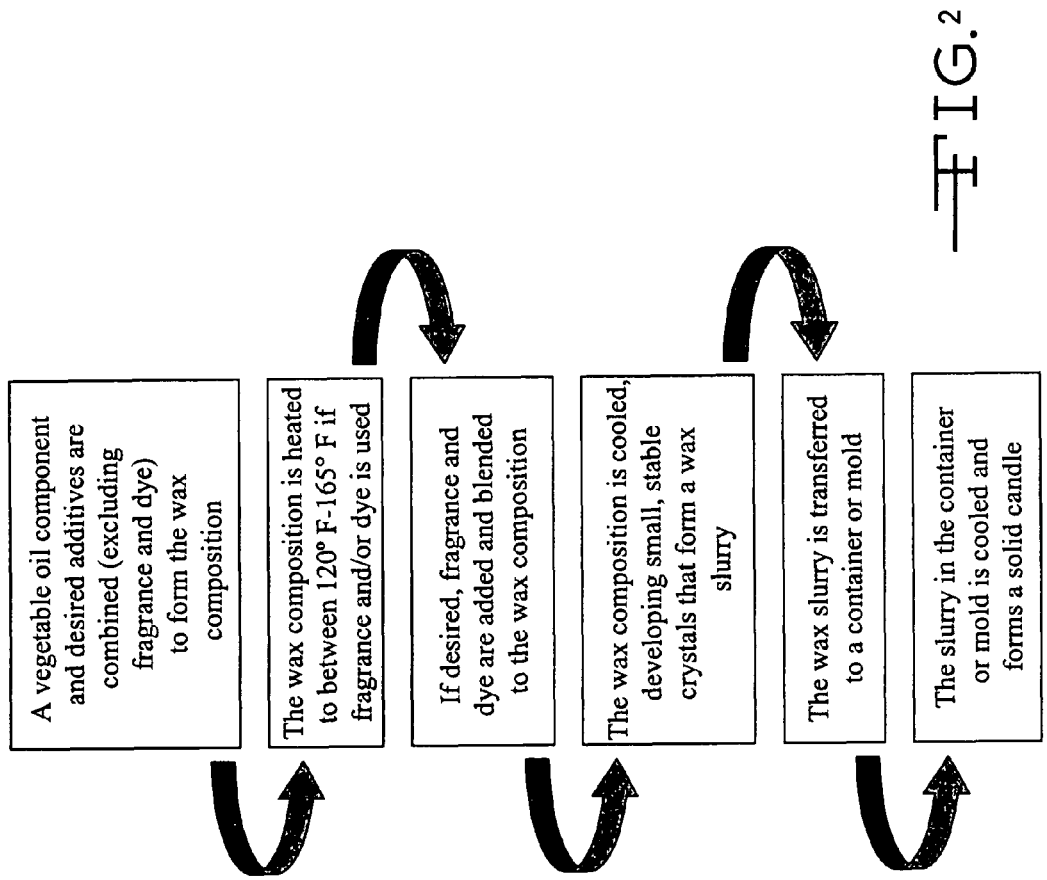
FIG. 2 generally describes a method of making a candle from a vegetable oil-based candle wax.

The present invention contemplates a method of making a candle from a vegetable oil-based candle wax. Generally, the present method of making a candle includes the steps of combining and blending a vegetable oil component and any desired additives to form a wax composition. Optionally, fragrance and coloring can be added to the wax composition. The wax composition is cooled causing the formation of small, stable crystals that generate a thick viscous wax slurry. The slurry is cooled to solidify and form a candle. The wax slurry can optionally be transferred to a jar, mold, or other container before cooling it to form the candle.

More specifically, a vegetable oil component and any desired additive or additives can be blended together to form a wax composition. The wax composition can be contained in a tank or other storage container such as, for example, a holding tank 10. The vegetable oil component and additive(s) can be blended together before they are placed in the holding tank 10, or they can be blended after the vegetable oil component is in the holding tank 10. The vegetable oil component and additive(s) may be blended by any method known in the art, such as, for example using an agitator, or manually mixing the oil and additive(s) together.

The candle wax composition of the present invention comprises a vegetable oil component that includes partially hydrogenated vegetable oil in the amount of approximately 80% to 100% of the weight of the total candle wax, but preferably 85% to 98%, and most preferably 88% to 94%. The vegetable oil component can be, for example, soybean oil, palm oil, cottonseed oil, rapeseed oil, canola oil, peanut oil, coconut oil, sunflower oil, safflower oil, palm kernel oil, corn oil, or any other vegetable oil known in the art, as well as combinations thereof. The vegetable oil component may for example, also contain 1% to 20% by weight, but preferably 7% to 12%, and most preferably 10% cotton stearine, with the remainder being partially hydrogenated soybean oil. These oils can be treated by any method known in the art to provide the desired physical characteristics (solid fat content, melting point, iodine value, etc.), such as described by U.S. Published Application 2003/0017431 to Murphy, which is herein incorporated by reference.

Although the vegetable oil component can be used alone, one or more additives may be included to form a candle wax composition. The wax composition, including the desired additives, and fragrance and/or dye, if desired, should contain a melting point range of from approximately 118° F. (47.78 C) to 133° F. (56.1° C.).

Turning now to possible additives, one or more emulsifiers may be combined as an additive to the vegetable oil component. Emulsifiers act to modify surface tension in the component phase of an emulsion and establish a uniform dispersion between the vegetable oil and other additives present in the wax composition. Emulsifiers can help facilitate blending fragrance and/or coloring into the wax composition. These emulsifiers can comprise between 0.25% and 4% of the total weight of the candle composition, but preferably between about 0.75% to 2%, and most preferably 1% to 2%. An example of such an emulsifiers is monodiglyceride. Emulsifiers can also act to increase the melting point of the wax composition and achieve a desired wax composition melting point. An example of such an emulsifier is distilled monoglycerides. The emulsifiers that perform this function can comprise between approximately 1.5% and 3.5% of the total weight of the candle composition, and preferably between approximately 1.75% and 2.75%.

Additional additives may be included in the candle wax composition. For example, the wax composition may contain additives that operate as fine crystal promoters, such as, for example, sodium stearoyl lactylate, or other vegetable oils, such as cottonseed oil, or palm oil, as well as components thereof. These promoters act to encourage the formation of beta prime crystals, which are small, stable crystals that pack tightly to produce a well-formed, solid candle. The fine crystal promoters of the present invention can comprise between approximately 0.25% and 0.5% of the total weight of the candle wax composition.

Crystal inhibitors may also be blended with the vegetable oil component. Crystal inhibitors act to increase congeal time of the wax composition, which promotes proper blending of the vegetable oil component and additives in forming the wax composition. Appropriate crystal inhibitor compositions are, for example, sorbitan tristearate, polysorbate 80, polysorbate 65, or polyglycerol ester, and can comprise between approximately 0.005% to 0.25% of the total weight of the candle wax composition.

Additives may also be included to decrease the tendency of fragrance, coloring, or other additives to migrate to the outside surfaces of the candle. Examples of such additives are alpha olefin polymers such as Vybar, or sorbitan triesters such as sorbitan tristearate. The additives that perform this function should comprise between approximately 0.05% to 0.6% of the total weight of the candle wax composition, and preferably between about 0.15% to 0.45%.

Other additives, such as palmitic, and citric acids, paraffin, UV inhibitors, antioxidants, fragrance retainers, and combinations thereof, as well as any other additives known in the art can be added.

The inclusion of coloring and fragrance into the vegetable oil based candle wax as disclosed herein is optional, and known in the art. It has been disclosed, for example, in U.S. Pat. No. 6,503,285 to Murphy, the disclosure of which is herein incorporated by reference. Appropriate fragrances are provided, for example, by fragrance manufacturers. Excess fragrance can lead to bleeding, which occurs when the liquefied fragrance seeps out from the candle. Deficiencies in fragrance can, however, lead to a faint smelling candle. If the vegetable oil-based candle contains soybean oil, it is preferred that the fragrance component has been formulated for soy. The fragrance component should be present in desired quantities. If desired, a suitable amount of fragrance is, for example between about 1% and 25%, preferably between about 4.5% to 8%, and most preferably between about 6% and 7% of the total candle wax composition weight. Although the fragrance can be in solid form, a fragrance in liquid form is preferred.

Regarding the use of dye in the present candle wax, it is important to avoid adding too much dye, as it can lead to a plugged wick that does not properly burn. Too little dye, however, will produce an off-color or dull candle. The dye component, if desired, can be added in those amounts known in the art, such as between 0% to 2% of the total candle wax composition weight. Although the dye can be in solid form, a dye in liquid form is preferred. If the vegetable oil-based candle contains soybean oil, it is preferred that the dye component has been formulated for soy.

The addition of additives to the vegetable oil component, including fragrance and dye, can occur at any time during formation of the wax composition. The additives, for example, can be added before, during, or after the addition of the dye and fragrance to the vegetable oil component. To ensure appropriately blended fragrance and dye into the wax composition, it is preferred that they are added when the temperature of the vegetable oil component is above its congeal point (i.e., where the wax composition begins to cloud and form crystals, commonly known as the cloud point). Such temperatures are for example, between about 120° F. (48.9° C.) and 165° F. (73.9° C.), between about 120° F. (48.9° C.) and 135° F. (57.2° C.), between about 145° F. (62.8° C.) and 155° F. (68.3° C.), with target temperatures of, for example, approximately 130° F. (54.5° C.) or approximately 150° F. (65.6° C.).

Maintaining the wax composition within the above temperature range during the addition of fragrance in coloring facilitates complete integration of additives into the wax composition, which allows for even and vibrant coloring and fragrance throughout the candles. If the temperature is too low, some of the crystals in the wax composition, for example, can form without taking on color or fragrance. These crystals will appear white or uncolored in a colored candle, destroying the desired uniformity of color. If, however, the temperature is too high, the wax composition can discolor and/or emit a burnt smell. A high wax composition temperature can also consume a portion of the added fragrance, requiring the addition of more fragrance to achieve the same volume of fragrance. The temperature of the wax composition can be controlled using any temperature control method known in the art, such as a heat exchanger.

The vegetable oil component can be blended with the desired fragrance, dye or other additives using any method known in the art. The blending can occur in the holding tank 10 or other storage container/tank. As used herein, tank refers to any container of any size known and/or used in the art for holding and/or combining various candle wax components. Further, the vegetable oil component can be released from the holding tank 10 and transferred to a different tank or container used for combining the materials. A slurry tank 11, for example, may be used. Prior to blending the vegetable oil component with any additives, it is preferred that the vegetable oil component is heated, for example, to a temperature at or above its melting point. A sufficient temperature is, for example, approximately 150° F.

In one example, a holding tank 10 or other storage container is joined to a slurry tank 11 using any appropriate piping, tubing, or other connection means. Once the vegetable oil component is heated to an appropriate temperature, it can be transferred to the slurry tank 11 and mixed with appropriate amounts of fragrance and/or dye. Alternatively, desired additives can be added to the vegetable oil component to form a wax composition, and then transferred to the slurry tank 11. A dye tank 12 containing a desired dye, a fragrance tank 13 containing a desired fragrance, or both, can also be connected to the slurry tank 11. Once the vegetable oil component (no combined additives) or the wax composition (vegetable oil component plus combined additives) is in the slurry tank 11, the appropriate amounts of fragrance and dye can be released from their respective tanks and added to the slurry tank 11. Once present in the slurry tank 11, the wax composition/vegetable oil component, fragrance, and dye components can then be blended under constant agitation, to ensure full integration of the dye, and/or fragrance into the wax composition. Alternatively, the dye and fragrance can be added into the vegetable oil component along with the other additives so long as the wax composition is sufficiently blended before cooling occurs.

Generally, a slurry tank 11 should be of sufficient size and volume to accommodate the vegetable oil component/wax composition, fragrance, and/or dye whether or not the components are mixed in the slurry tank 11. Further, if the components are blended in the slurry tank 11, there should be sufficient room to allow for mixing the components together. The slurry tank 11 can be any shape, but preferably contains an angled portion 14 at the bottom, which acts to funnel the wax composition or slurry for its departure from the slurry tank 11 into, for example, the fill line 15, a container 17, or mold. The slurry tank 11 may further contain an opening through which the wax composition, fragrance, dye, or any other additives can be added to the slurry tank 11.

To assist in blending the vegetable oil component or wax composition if any additives, including dye or fragrance have been added, the slurry tank 11 may contain an agitator that blends the components together. The agitator may further contain scrapers or blades that can scrape the edges of the slurry tank 11 to remove any solidified wax from the slurry tank 11 walls. The speed of the agitator should be sufficient to promote small, uniform particles, but reduce the possibility of air induction into the vegetable oil component/wax composition or wax slurry as it forms. Additionally, as the vegetable oil component/wax composition approaches and reaches its congeal point, the agitator speed may be reduced to further reduce the possibility of the entrapment of air and provides for a uniform, solid, and well-formed candle. The agitator speed may vary based on vessel size and/or configuration or agitator size and/or configuration.

Optionally, the slurry tank 11 may be connected to a scale 23, which measures the weight of the slurry tank 11 so that the fragrance, dye, or other additive components can be added in accurate amounts. A scale can also be used in connection with the dye tank 12, fragrance tank 13, and/or the holding tank 10. Further, other measurement methods or devices may also be used in connection with, for example, the slurry tank 11, dye tank 12, and/or fragrance tank 13.

In one aspect, the present method promotes the formation of a wax slurry by controlling the cooling of the wax composition. A wax slurry is created by cooling the wax composition so that it forms small, stable crystals, which pack tightly together. The wax slurry, as discussed herein, is a thick, viscous mixture of the wax composition that has partially solidified by forming crystals, and partially remained in liquid or semi-liquid form. By promoting a wax slurry that contains small, stable crystals, the present process provides a high-quality and well-formed candle. Such a candle is optimal as a container candle because the wax slurry solidifies, but does not significantly reduce in size or alter shape, which provides a clean looking, well formed candle having vibrant, even coloring and long lasting fragrance.

Unstable crystals are problematic for the manufacture of properly formed candles because if unstable crystals are formed during slurry formation, the crystals in the finished candle can change shape and create an uneven or mottled candle appearance. Further, smaller crystals pack more tightly together, resulting in candles that do not significantly shrink away from the sides of the container 17. As used herein, container refers to any jar, mold, or other container that a wax slurry is placed in to solidify and form a candle.

In addition, controlling the consistency of the wax slurry is important because if the slurry is too thick, the resulting candle can be uneven, or contain other flaws. If, however, the slurry is too thin, the candle can be susceptible to shrinking and/or erratic and unstable crystal formation, which can lead to an ill-formed candle having multiple defects, i.e., mottled and uneven appearance. By controlling the wax composition temperature and cooling of the wax composition, the manufacturer can regulate the formation of the wax slurry. Further, controlling the cooling of the wax composition to promote formation of the desired small, stable crystals, facilitates optimal candle production, performance, and appearance. Cooling the candles as described herein promotes an optimal candle that does not suffer from performance problems of cracking, discoloration, polymorphing triglycerides, etc., but has vibrant, even coloring and a long lasting fragrance. The slurry temperature control technique should cool the wax composition so that it creates an optimal slurry, but should also maintain a sufficient temperature to ensure that the wax composition does not solidify, for example, in the slurry tank 11, or other slurry-forming container. A wax slurry, as disclosed herein, is formed when the wax composition is cooled to between about 92° F. (33.3° C.) and 135° F. (57.2° C.), preferably between about 107° F. (41.67° C.) and 116° F. (46.67° C.), and most preferably between about 112° F. (44.45° C.) and 115° F. (46.1° C.).

One way to control the wax composition temperature during slurry formation is to use a cooling mechanism in the tank or container into which the wax composition has been placed. For example, a slurry tank 11 with a jacket or sleeve 16 along its inside walls can be used to control slurry formation. The sleeve 16 may contain a temperature control device or a temperature control substance, such as water, ammonia, freon, glycol, or any other cooling substance known in the art.

The temperature control substance can be cooled to a temperature of between about 50° F. (10° C.) and 90° F. (32.2° C.), preferably between about 75° F. (23.89° C.) and 80° F. (26.67° C.) with a target temperature of approximately 75° F. (23.89° C.). The cooling process of the temperature control substance can be conducted by any process known in the art, such as, for example, using a heat exchanger, freon, ammonia, or glycol. The device or substance in connection with the sleeve 16 cools the wax composition to create a slurry with the desired crystals.

Once the wax composition is cooled and the wax slurry with the appropriate viscosity and crystal formation is generated, the slurry can then be transferred from its cooling container or tank into a container 17. The slurry is then cooled and solidified to form a candle. The wax slurry can be transferred to the container 17 by any method known in the art, such as for example, using a fill line 15, or manually pouring the wax slurry.

A fill head 18 can optionally be connected to the fill line 15 or other connection means. The fill head 18 monitors and controls the transfer of the wax slurry to a jar or other container. Because the wax slurry is a thick, viscous composition, pressure from a compressor with air, nitrogen, or any other known substance may be used to force the slurry from the slurry tank 11 or other cooling container into a container 17. Further, pressure may be used to force the slurry through a fill line 15, a fill head 18 or both, and into a container 17. The fill head 18 may further contain an ultrasonic, or other sensor that ensures accurate and even filling of the containers 17. Any other filling device known in the art to facilitate even and accurate filling of containers may further be used.

Slurry-filled containers can be cooled using any method known in the art. The formation of optimal candles, however, can be influenced by proper cooling of the wax slurry, which can be controlled, in one aspect, by optionally cooling the containers 17 to a temperature range of from about 50° F. (10° C.) to 80° F. (26.67° C.), with a preferred temperature of about 60° F. (15.6° C.) before filling them with the slurry. One such method of cooling the containers 17 is to blow air, preferably cooled to between about 45° F. (7.23° C.) and 95° F. (35° C.) onto or in the containers 17 before they are filled with the wax slurry.

Optionally, the temperature of the container 17 can be further controlled by conveying the slurry-filled container through an air stream during cooling, which stabilizes the container 17 temperature and helps with the wax slurry cooling process. The air stream volume and temperature can vary, so long as the container 17 temperature is less than the temperature of the wax slurry being transferred to the container 17. Optimally, the air stream temperature should fall within the range of about 50° F. (10° C.) to about 70° F. (21.1° C.), but the air stream can be any temperature so long as the container temperature is lower than the wax slurry temperature at the time the wax slurry is transferred into the container.

A method of conducting the container cooling and filling process as described herein is to utilize a conveyor system that transfers a container 17 through various stations to provide the above-discussed filling and cooling functions. For example, an empty container 17 can be placed on a conveyor that travels under an air blower 19 cooling the container 17, for example, to a temperature of between about 45° F. (7.23° C.) and 95° F. (35° C.), with a preferred temperature of about 60° F. (15.6° C.) before it is filled with the wax slurry. The container 17 can then be transferred through the fill station 20 where the slurry is forced into the container 17 and then transferred through a cooling tunnel 21. The cooling tunnel 21 can be of any shape so long as it is of sufficient size and shape to allow the forced air introduced through an opening 24 in the cooling tunnel 21 to circulate around the slurry-filled containers traveling on the conveyor. The cool air circulated through the cooling tunnel can, for example, be between about 45° F. (7.23° C.) and 95° F. (35° C.), but preferably between about 58° F. (14.4° C.) and 61° F. (16.1° C.). Having such air circulating through the cooling tunnel helps cool the slurry relatively quickly, but allows it to set first, providing optimal candle formation. As used herein, a "set" candle, refers to a candle that has cooled and hardened sufficiently that it can be transported without the outside layers of the wax slurry shifting within the container, but is not necessarily cooled and hardened throughout.

The cooling tunnel 21 can optionally contain a fan 21 or fans to re-circulate the forced air throughout the cooling tunnel 21. Optimally, the fans 21 should be located opposite from the opening 24. Preferably, the cooling tunnel 21 is a covered structure that retains the circulating air in close proximity to the slurry-filled containers. The air in the cooling tunnel 21 should, however, not be so vigorous that it disturbs the congealing top of the setting wax slurry in the container 17. The cooling tunnel 21 should be of sufficient length so that the candles have cooled enough to set by the time they exit the tunnel. A sufficient length is, for example, 60 feet.

Encapsulated within and extending from at least a portion of the candle is a wick extending, preferably longitudinally, through the candle. The wick may be comprised of any conventional wick material known in the art, but is preferably made of natural materials. The candle can be made in a mold and be freestanding, but is preferably formed within a jar, mold or other container, which can be of any shape or construction known in the art.

The wick can be encapsulated in the wax portion of the candle by any method known in the art. For example, a wick may be positioned into a container 17, which is then filled with wax slurry. The wick may be placed in the container using any method known in the art. A preferred technique for accurately placing the wick in a container 17 is using a wick ring, or other similar device known in the art. The wick is attached to the wick ring, which is then placed on the rim of the container. The wick ring, therefore, holds the wick in place until the container is filled with the wax slurry. The wick ring can be of any size, shape, or construction.

The finished candles may optionally be labeled using any method known in the art, such as, for example, a wrap-labeling machine. The containers 17 or candles may also be labeled manually.

The method, as described herein, provides well-formed candles having even, long-lasting fragrance and bright, even coloration. In addition, the candle does not suffer from the previously known problems of cracking, shrinking, and discoloration around the outside of the candle caused by polymorphing triglycerides.

The following examples are presented to illustrate candles of the present invention and to assist one of ordinary skill in making and using the same. The examples are not intended in any way otherwise to limit the scope of the invention.

Example 1

A vegetable oil-based candle wax was made from the following process:

A vegetable oil component was heated to a temperature above its melting point and desired additives were combined and blended to the vegetable oil component to form a wax composition. The wax composition was cooled to a temperature of about 150° F. and the desired amounts of fragrance and dye were blended into the wax composition. The wax composition was then cooled to a temperature of 112° F. to create a wax slurry. The wax slurry was then transferred to a container and cooled to form a solidified candle.

Example 2

By way of further example, a vegetable oil based candle was made using the following process. A vegetable oil component of Naturewax C-1 made by Cargill was heated to a temperature of approximately 150° F. in a holding tank 10. The heated vegetable oil component was then transferred to a slurry tank 11 where it began the cooling process. Once the vegetable oil component was in the slurry tank 10, 10% by weight Master Chef® Pure Vegetable Stable Flake-P (Item Number 19249, made by Cargill) and 0.15% by weight of Cetyl Stearyl Alcohol (Product CS20, made by Lipochem) were added to the vegetable oil component as additives and combined to form a wax composition. Once the wax composition was cooled to a temperature of approximately 130° F. about 6% by weight of a liquid fragrance and about 0.1% by weight of a liquid dye were added to the wax composition under constant agitation. While blending the fragrance, dye, and wax composition, the wax composition in the slurry tank 11 was cooled to a temperature of between approximately 112° F. and 115° F. to form a wax slurry. The wax composition temperature was lowered using a sleeve 16 along the inside of the slurry tank 11 walls containing a temperature control substance of water cooled to approximately 75° F. The wax composition and wax slurry (during and after its formation) was continuously agitated with sufficient speed to completely blend the ingredients and promote small uniform particles, but did not induct air into the wax composition or wax slurry as it formed. Once cooled to between about 112° F. and 115° F., the wax slurry was transferred to a cooled container having a temperature of approximately 60° F. Once filled, the container was conveyed through a cooling tunnel that had circulating air, cooled to a temperature of between about 58° F. to 61° F. As the container was conveyed through the cooling tunnel, the wax slurry cooled sufficiently to set, and eventually hardened to form into a candle. The resulting candle has vibrant, even coloring and even, long-lasting fragrance throughout the entire burn of the candle.

While the present invention has been illustrated by description of several embodiments, and while the embodiments have been described in considerable detail, it is not the intention of the applicant to restrict, or in any way limit the scope of the appended claims to such detail. Additional advantages and modifications may readily appear to those skilled in the art.

What is claimed is:

1. A method of making a candle vegetable oil-based candle wax comprising the steps of:
   combining a partially hydrogenated soybean oil and at least one additive to form a wax composition
   cooling said wax composition below its congeal point to develop crystals and formulate a wax slurry;
   pouring said wax slurry into a container; and
   cooling said wax slurry in said container to form a candle;
   wherein said cooling of said wax composition to form said wax slurry is controlled using a slurry tank having a temperature control device;
   where the wax composition is approximately 80% or more partially hydrogenated soybean oil.

2. The method of claim 1, further comprising blending desired amounts of dye and fragrance into said wax composition before said cooling said wax composition to form said wax slurry.

3. The method of claim 2, wherein said wax composition is maintained at a temperature of between about 120° F. to 165° F. before blending said fragrance and said dye into said wax composition.

4. The method of claim 1, wherein said wax composition is cooled to a temperature of between approximately 100° F. and 120° F. to form said wax slurry.

5. The method of claim 4, wherein said wax composition is cooled to a temperature of between approximately 112° F. and 117° F. to form said wax slurry.

6. The method of claim 1, wherein the temperature control device to control said wax slurry formation comprises a sleeve containing a temperature control substance in at least one inside wall of said slurry tank.

7. The method of claim 6, wherein said temperature control substance is selected from the group consisting of water, ammonia, glycol, and combinations thereof.

8. The method of claim 7, wherein the temperature control substance is cooled to a temperature of between approximately 50° F. and 90° F.

9. The method of claim 8, wherein the temperature control substance in the slurry tank is cooled to a temperature of between approximately 75° F. and 80° F.

10. The method of claim 1, further comprising applying an air stream to said container before transferring said wax slurry into said container.

11. The method of claim 10, wherein said air stream applied to said container has a temperature of between about 45° F. to 95° F.

12. The method of claim 1, wherein the cooling of the wax slurry in the container is at least partially conducted by conveying the container filled with the wax slurry through an air stream.

13. The method of claim 12, wherein said air stream has a temperature of between about 50° F. to 70° F.

14. The method of claim 1, wherein said partially hydrogenated soybean oil has a melting point of between about 118° F. to 133° F.

15. The method of claim 1, wherein the additives include a second vegetable oil.

16. The method of claim 15, wherein said second vegetable oil comprises palm oil.

17. The method of claim 12, wherein said cooling of said wax slurry is at least partially conducted by conveying the container filled with said wax slurry through a cooling tunnel.

18. The method of claim 17, wherein said air having a temperature of between about 45° F. and 95° F. circulates throughout said cooling tunnel.

19. The method of claim 1, wherein the additive comprises cetyl stearyl alcohol.

20. A method of making a candle vegetable oil-based candle wax comprising the steps of:
   combining a partially hydrogenated soybean oil and at least one additive to form a wax composition
   cooling said wax composition below its congeal point to develop crystals and formulate a wax slurry;
   transferring said wax slurry to a container; and
   cooling said wax slurry in said container to form a candle;
   where the wax composition is approximately 80% or more partially hydrogenated soybean oil;
   wherein the additive comprises cetyl stearyl alcohol.

* * * * *